United States Patent Office 3,081,154
Patented Mar. 12, 1963

---

3,081,154
PROCESS FOR PREPARING FINE SIZE SILICA
Ellsworth G. Acker, Baltimore, and Moises G. Sanchez, Glen Burnie, Md., assignors to W. R. Grace & Co., New York, N.Y., a corporation of Connecticut
No Drawing. Filed Nov. 17, 1959, Ser. No. 853,443
7 Claims. (Cl. 23—182)

This invention relates to a process for preparing high purity fine silica and in particular to low density silicas characterized with high surface area and high pore volumes.

Fine size silicas of low density and high purity find particular use as rubber reinforcing agents, grease thickeners, dye carriers in the manufacture of sensitized paper, anti-blocking agents, heat insulators and a host of other similar applications. These silicas are generally prepared by neutralizing an alkali metal silicate, such as sodium silicate, with a suitable acid, recovering the resulting silica, purifying and drying the recovered silica. In such preparations, difficulty is frequently encountered in removing the alkali metal oxide, particularly sodium oxide, from the silica to an acceptable level. Failure to extract the soda obviously adversely affects the purity of the product with a concomitant increase in density. Efforts to reduce the soda content include purification with copious quantities of washing medium or resorting to a base exchange operation. Both procedures have distinct disadvantages. In the former case the washing period is quite prolonged while in the later case the exchange operation increases the manufacturing costs.

It is, therefore, a primary object of this invention to provide a process for preparing high purity, low density silicas which overcome the prior art disadvantages. This objective is realized by reacting an ammonium silicate solution with a suitable solution ammonium salt, separating the resulting precipitated silica, purifying and drying said silica. The process yields a product having a surface area of at least 300 m.²/g. and a pore volume of at least 0.80 cc./g. These properties taken together at the stated minimum and corresponding higher values are characteristic of silicas having a low density. Moreover, by starting with ammonium silicate, the presence of the objectionable alkali metal oxide in the final product is obviously substantially eliminated.

In carrying out the process, the starting ammonium silicate may be prepared by an ion exchange technique. This comprises passing an aqueous sodium silicate solution through an ion exchange column containing a cationic exchange resin in the ammonium form to substitute the ammonium ion for the sodium ion. A suitable resin for effecting the exchange is strongly acidic cationic type known commercially as "Dowex 50" which consists of a styrene-divinyl benzene matrix bearing sulfonic acid groups as the functional cation-removing groups. An ammonium sulfate solution may be used to put the resin in the ammonium form. In effecting the exchange, the resin is preferably in finely divided state to insure intimate contact between the silicate solution and the resin. The sodium silicate solution used may have a silica-to-soda mol ratio of from 1:1 to about 4:1 and a silica concentration of from 5% to 30%. Generally the concentration of the silicate solution will be of the order of about 5% $SiO_2$ having a mol ratio of about 3.33:1 because such solutions are readily available commercially. When preparing sols having a silica content greater than 5%, gelation may occur and this can be avoided by partially removing the sodium in the ion exchange process, evaporating some of the water, followed by further ion exchange treatment.

The reaction involved in the exchange process between the aqueous sodium silicate solution and the ammonium form resin may be illustrated as follows:

$$NaOH \cdot (SiO_2)_x + NH_4R \rightarrow NH_4OH \cdot (SiO_2)_x + NaR$$

where $x$ is a number varying with th composition of the sodium silicate solution and R represents the resin molecule minus the cation. The ammonium silicate solution thus prepared is characterized as a pure stable silica sol which consists of colloidal dispersions of silica in the aqueous medium in which the ammonium ion acts as a stabilizer in preventing gelation of the silica.

The following represents a typical anaylsis of the ammonium silicate solution prepared by the exchange process:

| | | |
|---|---|---|
| Gravity | g./cc. | 1.0239 |
| $NH_3$ | percent | 0.90 |
| $Na_2O$ | do | 0.001 (less than) |
| $SO_4$ | do | 0.01 |
| $SiO_2$ | do | 5.16 |

To the ammonium silicate solution there is then added at room temperature and with vigorous agitation a sufficient amount of an aqueous ammonium salt solution to cause precipitation of the silica. While the mechanism of precipitation is not thoroughly understood, it is believed that it consists in rapidly decreasing the concentration of the ammonium ion which stabilizes the silica sol. By adding the common ammonium ion to the solution, ionization of the ammonium hydroxide which surrounds the colloidal silica is suppressed, thus leaving insufficient ammonium ions for stabilization and consequently precipitation of the silica ensues. Therefore, the higher the concentration of the ammonium salt the greater will be the suppression of the ionization of the base and concomitantly therewith more rapid precipitation of the silica. During precipitation, the hydrogen ion concentration in the slurry ranges from about pH 8.0 to 9.5.

Suitable ammonium salts to carry out the precipitation include ammonium sulfate, ammonium carbonate, ammonium phosphate, ammonium acetate, ammonium chloride and ammonium nitrate. This list is in no way exhaustive since other selective ammonium salts may be used effectively to precipitate the silica since the process involves the presence of a high concentration of ammonium ions and a pH range of approximately 8.0 to 9.5 during the salt addition. A distinct advantage in this process lies in the possible recovery and reuse of the precipitating salt.

After all of the ammonium salt has been added to the silicate solution, the resulting slurry is then preferably aged by heating for a given period of time. Such aging is desirable to remove ammonia which removal facilitates washing the scilica in a subsequent step. The ammonia may, of course, be recovered by any well known methods. Aging is generally carried out at about the boiling point and for a period of time sufficient to remove the volatile components with water being added back if desired to maintain constant volume. Aging continues up to about four hours during which time pH drops to the neutral point and below, generally leveling off at a value of about 4.0 to 5.0.

Following the aging step, the slurry is then dewatered by suitable means, such as filtration, decantation and the like. With the use of some salts, such as ammonium carbonate, the slurry may be dried directly following the aging step. It is, therefore, within the scope of this invention that the term dewatering shall include such drying. The dewatered slurry may then be futher processed as by drying, washing and redrying, the final procedures being dependent upon the particular salt employed. In the case of ammonium carbonate, drying the aged material constitutes the final step, there being no need for further purification of the resulting silica.

The invention is further illustrated by the following examples using the ammonium silicate solution prepared by the exchange process and in which a representative number of ammonium salts are used. Surface areas of the product were determined by nitrogen adsorption measurements according to the Brunauer-Emmett-Teller (BET) method as described in J. Am. Chem. Soc., 60, 309 (1938). Pore volume (utilizing BET equipment) equals the volume of nitrogen adsorbed and condensed in the pores of the material at a partial pressure of near 1 ($p/po$) near 1) where $po$ is the pressure of $N_2$ just prior to liquefaction at the temperature of liquid nitrogen. Pore diameter is calculated as the diameter of the pores in Angstrom units based on the formula $$PD = \frac{4PV(A.)^3}{SA(A.)^2} = A.$$

$$PD = \frac{4PV \times 10^{24}}{SA \times 10^{20}} = A.$$

*Example I*

300 ml. of ammonium silicate solution containing 5% $SiO_2$ and 0.9% $NH_3$ were added dropwise into 170 grams of 41% ammonium sulfate solution accompanied with vigorous agitation. The suspension was boiled for 2 hours with continued agitation to remove ammonia, partially dried in an oven at 70° C., washed with deionized water to remove soluble salts, and redried in an oven at 300° F. for approximately 24 hours. Analysis of the dried precipitated silica was as follows:

Surface area _____ m.²/g__ 414
Pore volume _____ cc./g__ 146
Pore diameter _____ A__ 141
T.V. (total volatile matter) _____ percent__ 5.40
$NH_3$ _____ do____ 0.02
$SO_4$ (dry basis) _____ do____ 0.052

*Example II*

400 ml. of ammonium silicate solution containing 5% $SiO_2$ and at a pH of 10.0 were passed into 133 ml. of 41% ammonium sulfate solution having a pH of 5.8. The mixture was vigorously agitated and the pH during mixing ranged from 8.2 to 9.3. The slurry was then boiled for 4 hours with addition of water to replace the loss. Following the boiling period, the pH dropped to 4.6 and it was then filtered under vacuum. The filter cake contained 90% water and the filtrate contained 71% of the ammonium sulfate used in the preparation. The cake was dried at 65° C. for 4 hours, washed on a vacuum filter with 2000 ml. of deionized water over a period of 2½ hours, and finally dried at 300° F. for 16 hours to yield 14 grams of fine silica which analyzed as follows:

Surface area _____ m.²/g__ 375
Pore volume _____ cc./g__ 1.52
Pore diameter _____ A__ 162
T.V. _____ percent__ 6.99
$Na_2O$ (dry basis) _____ do____ 0.019
$NH_3$ _____ do____ 0.05
$SO_4$ (dry basis) _____ do____ 0.27

It is worthy of note that the final product contained less than 0.02% sodium oxide, which amount is indeed quite innocuous. Moreover, 71% of the original amount of ammonium sulfate used to precipitate the silica was recovered and available for reuse in the process. This amount can be increased using closer control methods in the recovery system.

*Example III*

The minimum useful concentration of ammonium sulfate solution to precipitate the silica is demonstrated here. 300 ml. of ammonium silicate solution containing 5% $SiO_2$ were mixed with various concentrations of ammonium sulfate solution and the resulting slurry in each case was then boiled, filtered, dried, washed and redried at 300° F. Analyses of the final products were as follows:

| Concentration of $(NH_4)_2SO_4$ in 100 ml. of water | Properties of final silica product | | |
|---|---|---|---|
| | Surface Area, m.²/g. | Pore Volume, cc./g. | Pore Diameter, A. |
| 70 g | 414 | 1.46 | 141 |
| 41 g | 478 | 1.26 | 105 |
| 10 g | 436 | 0.80 | 73 |

It is noted that a direct relationship exists between the concentration of the ammonium sulfate and the pore volume and pore diameter of the resulting product. As the concentration is decreased there is a corresponding decrease in the surface properties. Of significance, is the influence of concentration on the pore volume which property characterizes to a large extent the density of the product.

*Example IV*

Two separate batches were prepared as follows. Each batch consisted of passing 200 ml. of ammonium silicate solution (5% $SiO_2$) into 70 ml. of water containing 50 g. of ammonium carbonate in a Waring Blendor. The pH of each mixture was 8.7. The two batches were then combined and aged for 4 hours by heating at 80–90° C. Following the aging period, the pH dropped to 7.1 and the slurry was spray dried at 300° F. Analysis of the product was as follows:

Surface area _____ m.²/g__ 358
Pore volume _____ cc./g__ 1.2
Pore diameter _____ A__ 128
T.V. _____ percent__ 7.21
$NH_3$ _____ do____ 0.05
$CO_2$ _____ None During the aging period, ammonia and carbon dioxide were evolved, recovered and used to prepare ammonium carbonate for reuse in the process. The aging may be dispensed with and the slurry may be spray dried. During such drying, ammonia and carbon dioxide is evolved and may be recovered. It is pointed out that the use of ammonium carbonate provides a simple process for producing the fine silica while providing the additional advantage of recovering the ammonium carbonate components.

*Example V*

400 ml. of ammonium silicate solution (5% $SiO_2$) were passed into 133 ml. of water containing 350 g. of ammonium acetate solution. The mixture had a pH of 9.0–9.1. It was then aged by heating for 4 hours at 100° C., dried, washed with 2000 ml. of hot water and redried overnight at 300° F. The product analyzed as follows:

Surface area _____ m.²/g__ 445
Pore volume _____ cc./g__ 1.64
Pore diameter _____ A__ 147

*Example VI*

400 ml. of ammonium silicate solution were passed into 133 ml. of water containing 60 g. of ammonium chloride, yielding a mixture having a pH of 8.6. It was then hot aged for 4 hours at 100° C. while maintaining constant volume by addition of water, dried at 80° C., washed with 2 liters of deionized water, and redried overnight at 300° F. Analysis of the surface properties was as follows:

| | |
|---|---|
| Surface area | m.$^2$/g__ 406 |
| Pore volume | cc./g__ 1.59 |
| Pore diameter | A__ 147 |

Example VII 400 ml. of ammonium silicate solution (5% $SiO_2$) were passed into 133 ml. of water containing 320 g. of ammonium nitrate. The resulting mixture had a pH of 8.2 and was then hot aged for 4 hours at 95° C. Upon termination of the aging period, the pH dropped to 4.3 and the aged material was washed with deionized water in order to remove a large portion of $NH_4NO_3$ prior to the drying step. The washed material was dried, rewashed with 3000 ml. of hot deionized water and redried at 300° F. for 18 hours. The final product analyzed as follows:

| | |
|---|---|
| Surface area | m.$^2$/g__ 311 |
| Pore volume | cc./g__ 1.65 |
| Pore diameter | A__ 212 |
| $NH_3$ (overall basis) | percent__ 0.04 |
| $NO_3$ (overall basis) | do____ 0.22 |

Example VIII 400 ml. of ammonium silicate solution (5% $SiO_2$) were passed into 175 g. of ammonium phosphate dissolved in 133 ml. of water. The mixture was boiled for 4 hours, dried at 70° C., washed with deionized water, and redried at 300° F. The product analyzed as follows:

| | |
|---|---|
| Surface area | m.$^2$/g__ 324 |
| Pore volume | cc./g__ 1.65 |
| Pore diameter | A__ 144 |

From the foregoing examples, it can be seen that the use of ammonium silicate as the source of silica and precipitated with a water-soluble ammonium salt results in a low density silica characterized with a high surface area and high pore volume. This is due to the absence of $Na_2O$ in the entire system and the use of a large concentration of the soluble ammonium salt to depress the stabilizing ammonium ion. This is comparable to the depression of the ionization of $NH_4OH$ by the addition of the ammonium salt to the aqueous base.

The following Example IX shows the influence on the pore volume of the product when precipitation is carried out with a sodium salt:

Example IX 400 ml. of ammonium silicate solution (5% $SiO_2$) were passed into 133 ml. of water containing 55 g. of sodium sulfate. The mixture was boiled for 4 hours, then dried at 70° C., washed with 2000 ml. of deionized water, and redried overnight at 300° F. The product analyzed as follows:

| | |
|---|---|
| Surface area | m.$^2$/g__ 325 |
| Pore volume | cc./g__ 0.69 |
| Pore diameter | A__ 85 |
| T.V. | percent__ 6.54 |
| $Na_2O$ (dry basis) | do____ 0.12 |
| $NH_3$ (overall basis) | do____ 0.06 |

It is readily apparent that the sodium salt does not yield a satisfactory product. The pore volume is quite low and the soda content is unsatisfactory.

According to the present invention, the reaction of aqueous solutions of ammonium silicate and a suitable ammonium salt yields a product constituted of at least 99.7% $SiO_2$ and having a primary particle size ranging between 20 to 250 millimicrons, a bulk density (loosely packed) from about 0.035 g./cc. to about 0.15 g./cc., and a soda content ($Na_2O$) of about 0.03% maximum. The substantial total absence of soda in the fine silica greatly influences its low density characteristic.

We claim:

1. A process for preparing a precipitated silica having a particle size ranging between 20 and 250 millimicrons and a surface area of at least 300 m.$^2$/g. and a pore volume of at least 0.80 cc./g. which comprises contacting a system consisting of colloidal silica dispersed in aqueous ammonia with a concentrated aqueous solution of an ammonium salt selected from the group consisting of ammonium sulfate, ammonium carbonate, ammonium acetate, ammonium chloride, ammonium nitrate, and ammonium phosphate, said salt solution having a concentration of at least 10 grams of salt per 100 milliliters of water, at a pH of about 8 to 9.5 and filtering, drying the recovered filter cake, purifying the dried cake of soluble salts and redrying the purified product.

2. A process according to claim 1 wherein the ammonium salt is ammonium sulfate.

3. A process according to claim 1 wherein the ammonium salt is ammonium carbonate.

4. A process according to claim 1 wherein the ammonium salt is ammonium acetate.

5. A process according to claim 1 wherein the ammonium salt is ammonium chloride.

6. A process according to claim 1 wherein the ammonium salt is ammonium nitrate.

7. A process according to claim 1 wherein the ammonium salt is ammonium phosphate.

References Cited in the file of this patent

UNITED STATES PATENTS

| | | |
|---|---|---|
| 2,114,123 | Hauser | Apr. 12, 1938 |
| 2,431,481 | Hurd | Nov. 25, 1947 |
| 2,457,971 | Voorhees | Jan. 4, 1949 |
| 2,601,235 | Alexander et al. | June 24, 1952 |
| 2,671,056 | Wolter | Mar. 2, 1954 |
| 2,731,326 | Alexander et al. | Jan. 17, 1956 |
| 2,765,242 | Alexander et al. | Oct. 2, 1956 |
| 2,785,051 | Miller | Mar. 12, 1957 |

OTHER REFERENCES

Mellor: A Comprehensive Treatise on Inorganic and Theoretical Chemistry, vol. 6, 1925, pages 323, 328–329, Longmans, Green & Co., New York.

Vail et al.: Soluble Silicates, vol. 1, pages 168–169, Reinhold Pub. Corp., New York, 1952.

Iler: The Colloid Chemistry of Silica and Silicates, pages 30–31, Cornell Univ. Press, Ithaca, N.Y., 1955.

UNITED STATES PATENT OFFICE
CERTIFICATE OF CORRECTION

Patent No. 3,081,154 March 12, 1963

Ellsworth G. Acker et al.

It is hereby certified that error appears in the above numbered patent requiring correction and that the said Letters Patent should read as corrected below.

Column 1, line 10, after "fine" insert -- size --; line 36, for "solution" read -- soluble --; line 68, for "in" read -- by --; column 2, line 6, for "th" read -- the --; line 55, for "scilica" read -- silica --.

Signed and sealed this 19th day of November 1963.

(SEAL)
Attest:

ERNEST W. SWIDER
Attesting Officer

EDWIN L. REYNOLDS

Acting Commissioner of Patents